United States Patent [19]

Watanabe et al.

[11] Patent Number: 4,646,185
[45] Date of Patent: Feb. 24, 1987

[54] MAGNETIC HEAD ASSEMBLY INCLUDING A LEAF SPRING

[75] Inventors: Toshinori Watanabe, Oaza-Sanashi; Ichiro Noguchi, Koide, both of Japan

[73] Assignee: Alps Electric Co., Ltd., Japan

[21] Appl. No.: 677,191

[22] Filed: Dec. 3, 1984

[30] Foreign Application Priority Data

Dec. 2, 1983 [JP] Japan ................................ 58-227851

[51] Int. Cl.$^4$ .............................................. G11B 5/27
[52] U.S. Cl. .................................................. 360/121
[58] Field of Search ....................... 360/121, 118, 129

[56] References Cited

U.S. PATENT DOCUMENTS 3,484,562 12/1969 Kronfeld .............................. 360/129
3,484,564 12/1969 Kronfeld .............................. 360/129
3,936,884 2/1976 Hogan ................................. 360/129
4,152,742 5/1979 Kronfeld .............................. 360/129

Primary Examiner—Robert S. Tupper
Attorney, Agent, or Firm—Guy W. Shoup

[57] ABSTRACT

A magnetic head having a central read/write core and a pair of erase cores is assembled with a leaf spring having corresponding slots for the cores. The leaf spring has a pair of clip arms at each end. The leaf spring with the assembled magnetic cores is fitted on an insulating holder case which has grooves for receiving the clip arms. The cores can be assembled more readily on the leaf spring than on the holder case, thus facilitating the assembly process and miniaturization of the magnetic head.

2 Claims, 4 Drawing Figures

MAGNETIC HEAD ASSEMBLY INCLUDING A LEAF SPRING

BACKGROUND OF THE INVENTION

The present invention relates to a magnetic head suitable for use in a drive unit for a magnetic disk, and more particularly to a magnetic head that may be easily assembled.

Magnetic disk drive units are getting smaller and smaller in size, and there is a demand for smaller magnetic heads for use therein. However, the components of smaller magnetic heads are not easily handled and, therefore, their size can not be reduced appreciably without complicating the automatic assembly of the magnetic head.

SUMMARY OF THE INVENTION

It is an object of the present invention to provide a magnetic head of a smaller size and yet can be assembled easily.

According to the present invention, a magnetic head includes a leaf spring having a pair of opposite arms and adapted to have the head assembly of the magnetic head mounted thereon, and a case receiving the arms of the leaf spring to fix the head assembly in position within the case.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
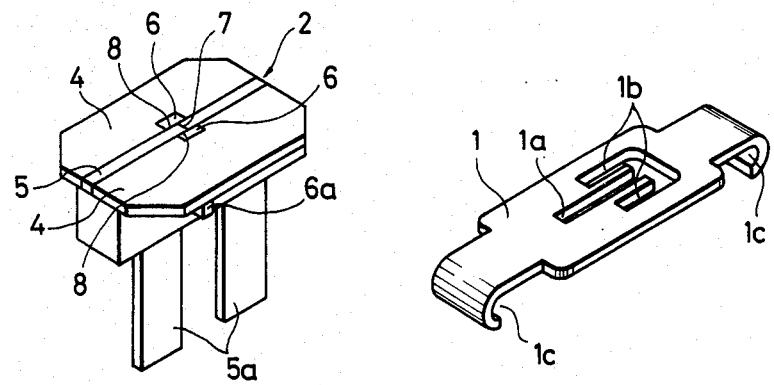
FIG. 1 is an exploded perspective view of a portion of a magnetic head assembly.
Figure 1:
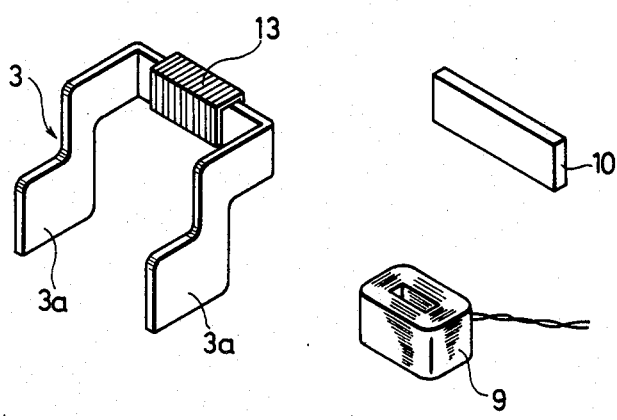

As shown in FIG. 1, a leaf spring 1 formed from a metal plate has a groove defined therein for supporting a core assembly 2 and an erase yoke 3. The groove includes a central slot 1a for receiving legs 5a of a read/write core 5 of the core assembly 2, and lateral slots 1b positioned one on each side of the central slot 1a for receiving legs 3a of the erase yoke 3. The leaf spring 1 has depending arm portions 1c formed on opposite ends thereof. The core assembly 2 includes a slider 4 of a nonmagnetic material such as a ceramic, having a groove defined therein with the read/write core 5 and erase cores 6 assembled in the groove, the erase cores 6 extending on the lateral sides of the read/write core 5. The read/write core 5 has a read/write gap 7, and erase gaps 8 are defined between the read/write core 5 and the erase cores 6. The erase yoke 3, which is substantially channel-shaped, supports an erase coil 13 wound thereon and is connected to ends 6a of the erase cores 6. A read/write coil 9 is fitted over one of the legs 5a of the read/write core 5. A back core 10 is connected to the legs 5a of the read/write core 5. A clip-shaped spring 11 interconnects the legs 5a of the read/write core 5 and the back core 10.

The above components will be assembled as follows: The legs 5a of the read/write core 5 are inserted through the central slot 1a of the leaf spring 1, and then the legs 3a of the erase yoke 3 are inserted through the lateral slots 1b from the reverse side of the leaf spring 1 to hold the ends 6a of the erase cores 6.

Figure 2:
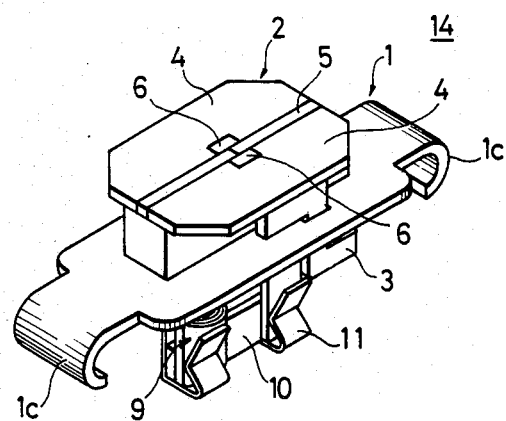
FIG. 2 is a perspective view of the magnetic head assembly as assembled.

Then, the read/write coil 9 is fitted over one of the legs 5a of the read/write core 5. The back core 10 and the legs 5a of the read/write core 5 are interconnected and clamped together by the spring 11. A head assembly 14 of FIG. 2 is thus assembled.

Figure 3:
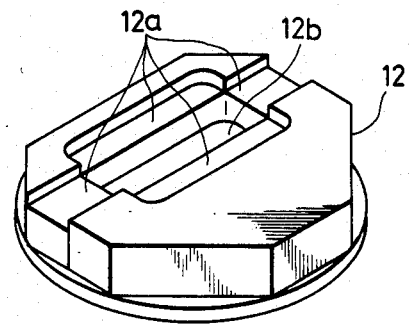
FIG. 3 is a perspective view of a case for the magnetic head of the present invention.
Figure 4:
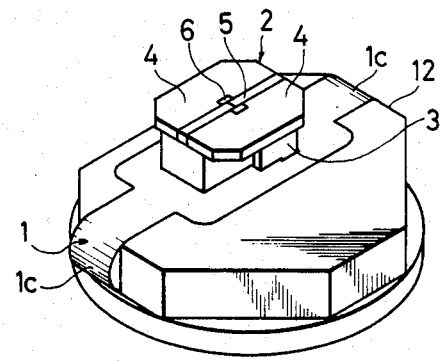
FIG. 4 is a perspective view of the magnetic head assembly of FIG. 2 as mounted in the case of FIG. 3.

FIG. 3 shows a case 12 formed of an insulating material such as a synthetic resin. The case 12 has a central groove 12a for receiving the leaf spring 1 therein, and a hole 12b for receiving the portion of the head assembly 14 extending below the leaf spring 1, that is, the legs 5a, the read/write coil 9, the back core 10, and the spring 11. For assembling the head assembly 14 in the case 12, the arm portions 1c of the leaf spring 1 of the head assembly 14 are fitted in the groove 12a. The head assembly 14 is completely assembled by bonding the same with an adhesive. A finally assembled configuration is illustrated in FIG. 4.

With the present invention, as described above, the head assembly 14 is assembled with the aid of the leaf spring 1, and the arms 1c of the spring 1 are fitted in the case 12. The various parts are therefore not directly assembled in the case, but can be assembled on the leaf spring in advance. Accordingly, the parts can be assembled in a relatively wide space, and can be put together more easily than would be if they were assembled directly in the case. This allows the magnetic head to be easily designed for a smaller size. The head assembly and the case can easily be assembled together simply by fitting the arms in the case.

Although a certain preferred embodiment has been shown and described, it should be understood that many changes and modifications may be made therein without departing from the scope of the appended claims.

What is claimed is:

1. A magnetic head comprises:
    a head assembly including a central read/write core having a pair of depending first legs, a pair of erase cores disposed on both sides laterally of said read/write core, and an erase yoke having a pair of second legs disposed in magnetic contact with said pair of erase cores, respectively;
    a spring member for mounting the components of said head assembly including a planar body having a central slot through which said depending first legs of said read/write core are inserted from one side of said planar body, a pair of lateral slots on both sides of said central slot through which said pair of second legs are inserted, respectively, from the other side of said planar body and fitted in magnetic contact with said erase cores, and a pair of arms on opposite ends of said planar body; and
    a case including means for receiving said arms of said spring member to fix said head assembly mounted on said spring member in position within said case.

2. A magnetic head according to claim 1, wherein said receiving means of said case includes a groove for receiving said planar body and said opposing arms of said spring member therein and a hole formed centrally of said groove for receiving the ends of said depending first legs of said read/write core of said head assembly therein.

* * * * *